US008010612B2

(12) United States Patent
Costea et al.

(10) Patent No.: US 8,010,612 B2
(45) Date of Patent: Aug. 30, 2011

(54) SECURE TRANSACTIONAL COMMUNICATION

(75) Inventors: Mihai Costea, Redmond, WA (US); Jeffrey B. Kay, Bellevue, WA (US); Jesse Dougherty, Bothell, WA (US); Mayerber Carvalho Neto, Bellevue, WA (US); Jain Chandresh, Sammamish, WA (US); Mayank Mehta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 310 days.

(21) Appl. No.: 11/736,487

(22) Filed: Apr. 17, 2007

(65) Prior Publication Data
US 2008/0263156 A1  Oct. 23, 2008

(51) Int. Cl.
G06F 15/16 (2006.01)
(52) U.S. Cl. ........ 709/206; 709/226; 709/245; 709/203; 709/219; 709/225
(58) Field of Classification Search .................. 709/206, 709/226, 245, 203, 219, 225
See application file for complete search history.

(56) References Cited

U.S. PATENT DOCUMENTS

| 6,484,197 B1 | 11/2002 | Donohue | 709/206 |
|---|---|---|---|
| 6,591,291 B1 | 7/2003 | Gabber et al. | 706/206 |
| 6,772,196 B1 | 8/2004 | Kirsch et al. | 709/206 |
| 7,117,358 B2 | 10/2006 | Bandini et al. | 713/153 |
| 7,139,825 B2 | 11/2006 | Andaker et al. | 709/225 |
| 2002/0087641 A1* | 7/2002 | Levosky | 709/206 |
| 2003/0200334 A1* | 10/2003 | Grynberg | 709/245 |
| 2004/0019688 A1* | 1/2004 | Nickerson et al. | 709/229 |
| 2004/0054887 A1 | 3/2004 | Paulsen, Jr. et al. | 713/154 |
| 2004/0148358 A1* | 7/2004 | Singh et al. | 709/207 |
| 2004/0236838 A1* | 11/2004 | Tout | 709/207 |
| 2004/0243837 A1 | 12/2004 | Fredette et al. | 713/201 |
| 2005/0108344 A1 | 5/2005 | Tafoya et al. | |
| 2005/0114453 A1* | 5/2005 | Hardt | 709/206 |
| 2006/0026438 A1* | 2/2006 | Stern et al. | 713/184 |

(Continued)

FOREIGN PATENT DOCUMENTS

CA  2447121 A1 *  1/2004

OTHER PUBLICATIONS

Albrecht, K. et al., "Spamato-An Extendable Spam Filter System", Computer Engineering and Networks Laboratory, http://www.disctcomp.ethz.ch/publications/ceas05.pdf, 8 pages.

(Continued)

Primary Examiner — Wing F Chan
Assistant Examiner — Benjamin M Thieu
(74) Attorney, Agent, or Firm — Woodcock Washburn LLP

(57) ABSTRACT

Systems for providing sign-up email addresses are disclosed herein. A user may set up a sign-up email address for receiving emails from a trusted, Internet-based enterprise. The user may set up a dedicated mailbox folder associated with the sign-up email address or enterprise. The email server may automatically direct emails coming from that enterprise into that folder. To "unsubscribe," the user needs only to delete the folder or the sign-up address. Emails from the enterprise to the sign-up address may be highlighted in the user's main inbox. Thus, the user may be assured that any such email is truly from the enterprise, and not a phishing expedition or spam. Such systems also provide the user with effective tools to recognize phish or spam emails that appear to be from the trusted enterprise and not to act on them.

18 Claims, 7 Drawing Sheets

U.S. PATENT DOCUMENTS

2006/0041621 A1\* 2/2006 Libbey .......................... 709/206
2006/0129644 A1   6/2006 Owen et al. ................... 709/206
2007/0043815 A1   2/2007 Tsang et al. .................. 709/206

OTHER PUBLICATIONS

Hall, R.J., "How to Avoid Unwanted Email", *Communications of the ACM*, 1998, 41(3), 88-95.

Reardon, M., "E-mail Service Vows to Stop Spam, Spare the Good", Feb. 5, 2004, 5 pages, http://news.com.com/2100-1032-5153907.html.

"PhishRepellent: Dedicated Anti-Phishing Technology", http://www.mail-filters.com/BestofBreed/Mail-Filters_Eat-More-Phish.htm, ©2001-2007, 3 pages.

Stern, P. et al., "Anonymous Aliases for On-line Communications", Application for Letters Patent.

EP Application No. 08745711.5: Extended European Search Report, Aug. 5, 2010, 7 pages.

\* cited by examiner

SECURE TRANSACTIONAL COMMUNICATION

BACKGROUND

"Phishing" is the act of sending an e-mail to a user falsely claiming to be an established, legitimate enterprise in an attempt to scam the user into surrendering private information that may be used for illicit purposes. Typically, such an e-mail directs the user to visit a Web site where the user is asked to update personal information, such as passwords and credit card, social security, and bank account numbers, that the legitimate organization already has. The Web site, however, is bogus and set up only to steal the user's information.

Phishing is growing in sophistication and cost to end users and financial institutions, and accounts for a significant portion of the traffic in malicious e-mail. Attackers have ditched virus and worm development and replaced that with increasingly sophisticated phishing campaigns, some of which are extremely targeted. Electronic newsletters, for example, which are often filtered out by spam filters, can be spoofed. It is often impossible/insecure to "unsubscribe" to such newsletters, because links in spam are often not trusted. Consequently, the "unsubscribe" link may not be used. And once an email address is given out, a recipient cannot guarantee that it will not be used for aggressive marketing or sold out to spammers.

It would be desirable, therefore, if a mechanism were available to protect electronic newsletters and other e-commerce sites from being easy targets for phishing. It would also be desirable if a clear, differentiated channel were available for transactional email (e.g., orders, statements, etc.).

SUMMARY

Systems and methods for providing smart, sign-up email addresses are disclosed herein. Systems and methods disclosed herein enable a user to set up a "sign-up" email address (or "alias") associated with a trusted internet-based enterprise. For example, a user may set up a sign-up email address for use by his bank in communicating electronically with the user. The user's Internet browser may detect that a user is about to "give away" his "main" email address, and caution the user that he is about to do so. The browser may offer the user an option to use a sign-up email address instead, for his own protection.

The user may set up a dedicated mailbox folder associated with that email address or enterprise. The email server may be programmed to automatically direct emails coming from that enterprise into that folder. Alternatively, incoming emails from a trusted enterprise may be highlighted in some fashion in the user's ordinary inbox (i.e., the inbox associated with the user's main email address). Thus, the user may be assured that any such email related to that enterprise found in the user's inbox or dedicated mailbox folder is truly from the enterprise, and not a phishing expedition or spam. It should be understood, of course, that phishing emails might still arrive in the user's junk folder, or even in the user's inbox. However, the systems and methods disclosed herein provide the user with effective tools to recognize such emails as phish or spam and not to act on them. Further, intelligent email filters may be employed to recognize and filter such emails.

Thus, such systems may provide a prophylactic to "phishing," and may tend to reduce the amount of "spam" that a user receives. The user may be assured that a received email is truly from the source the email suggests it is from. The user's "main" email address may be better protected from unnecessary or undesirable distribution. And the "unsubscribe" function is guaranteed to work—to unsubscribe, the user needs only to delete the mailbox folder associated with the sign-up email address.

Such systems, while obviously undesirable for phishers and spammers, may be very desirable for legitimate senders and marketers. Such systems may also be desirable for email service providers, such as hotmail, for example, as such systems provide for the creation of fewer temporary accounts.

DETAILED DESCRIPTION OF ILLUSTRATIVE EMBODIMENTS

Figure 1:
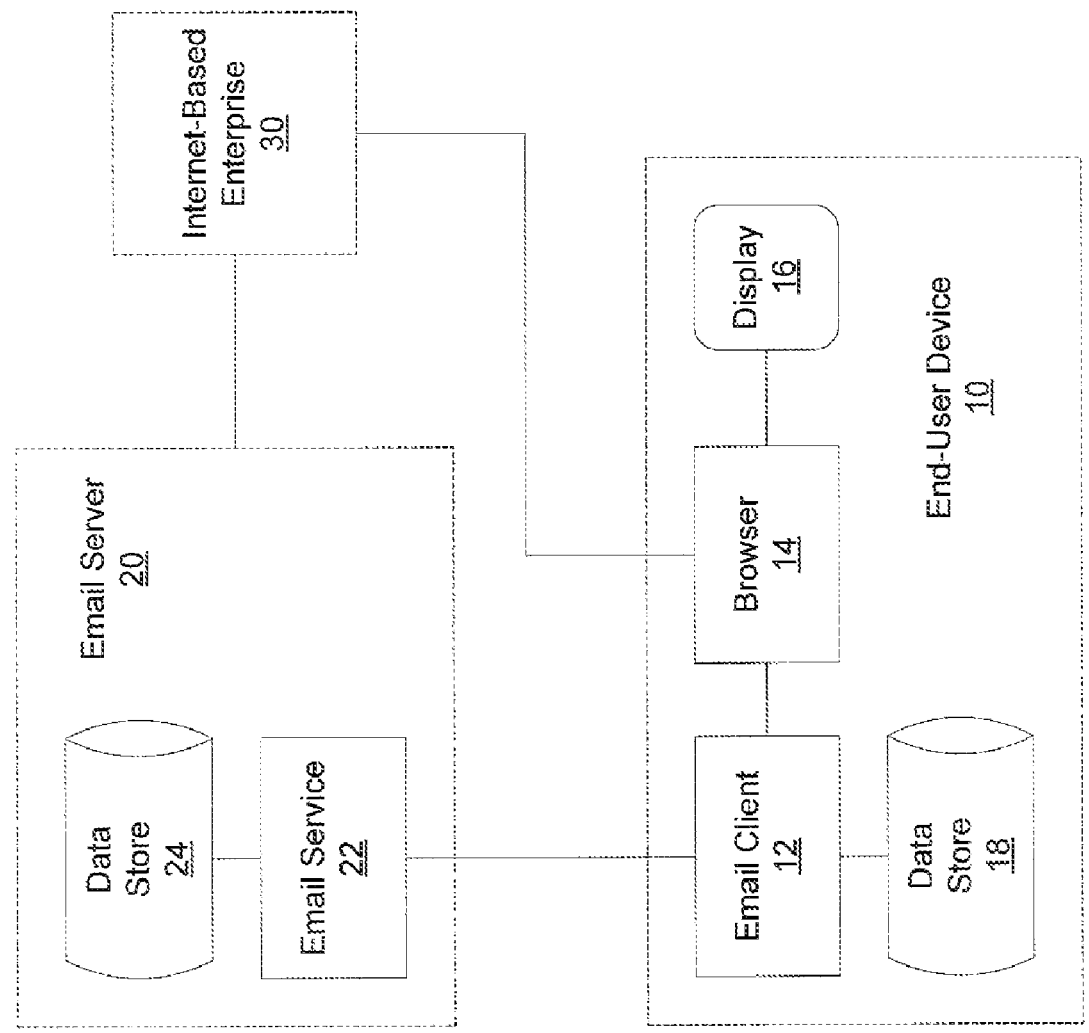
FIG. 1 is a functional block diagram of a system for providing sign-up email addresses.

FIG. 1 is a functional block diagram of a system for providing sign-up email addresses. As shown, such a system may include an email client 12 and browser 14 running on an end-user device 10. The end-user device 10 may be a desktop, laptop, or hand-held computing device, for example. Email clients are well-known. Microsoft Outlook is an example of an email client. Browsers are also well-known. Microsoft Internet Explorer is an example of a browser. The end-user device 10 may also have a data store 18 and a display 16.

The system may include an email service 22 running on an email server 20. Email services are well-known. Microsoft Exchange is an example of an email service. The email server 20 may include a data store 24. The email server 20 and the end-user device 10 may be interconnected via a local- or wide-area communications network, such as the Internet, for example.

An Internet-based enterprise 30 may be interconnected with the email server 20 and the end-user device 10 via a local- or wide-area communications network, such as the Internet, for example.

FIGS. 2A-2D depict a user interface and method for selecting a sign-up email address in a "trusted" sender's scenario. An example of such a scenario may be where the end-user is attempting to change his/her address or phone number that had been previously provided online to the user's bank. Such information is typically stored by such an enterprise. The user can "trust" that the enterprise will protect his/her personal information, such as his/her primary email address, social security number, mother's maiden name, etc. The end-user also wants to be sure that emails from that enterprise do not end up in the user's junk folder. However, the end-user wants to be able to differentiate legitimate emails from the enterprise from phish.

Figure 2A:
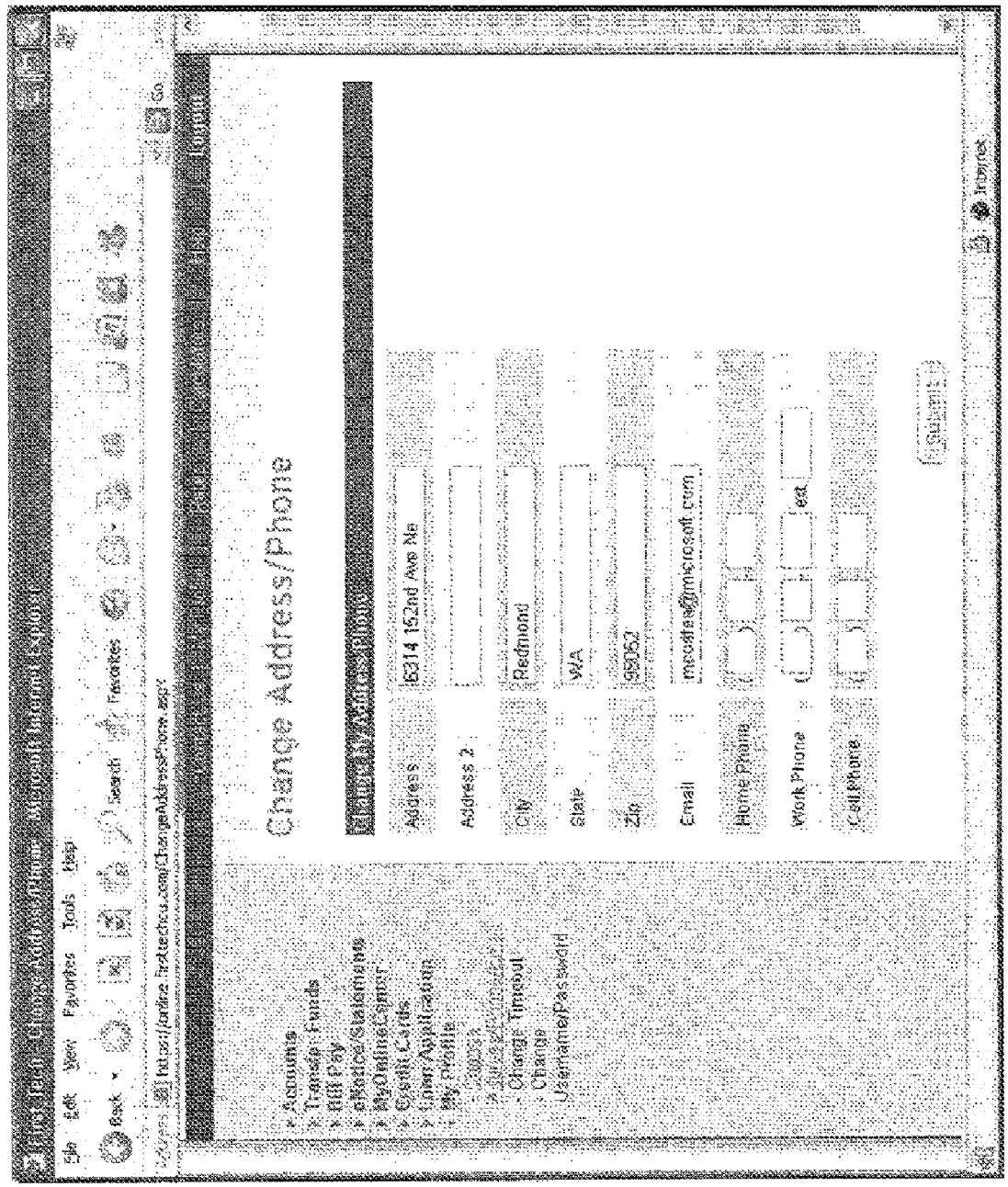
FIG. 2A-2D depict a user interface and method for selecting a sign-up email address.

FIG. 2A depicts a typical user-interface (e.g. a web page) wherein a user is expected to provide an email address (among other things). Separate fields may be provided for entry of such information. Each field may have a respective name, such as "Email," for example. As shown in FIG. 2A, the user has entered his "primary" email address.

Figure 2B:
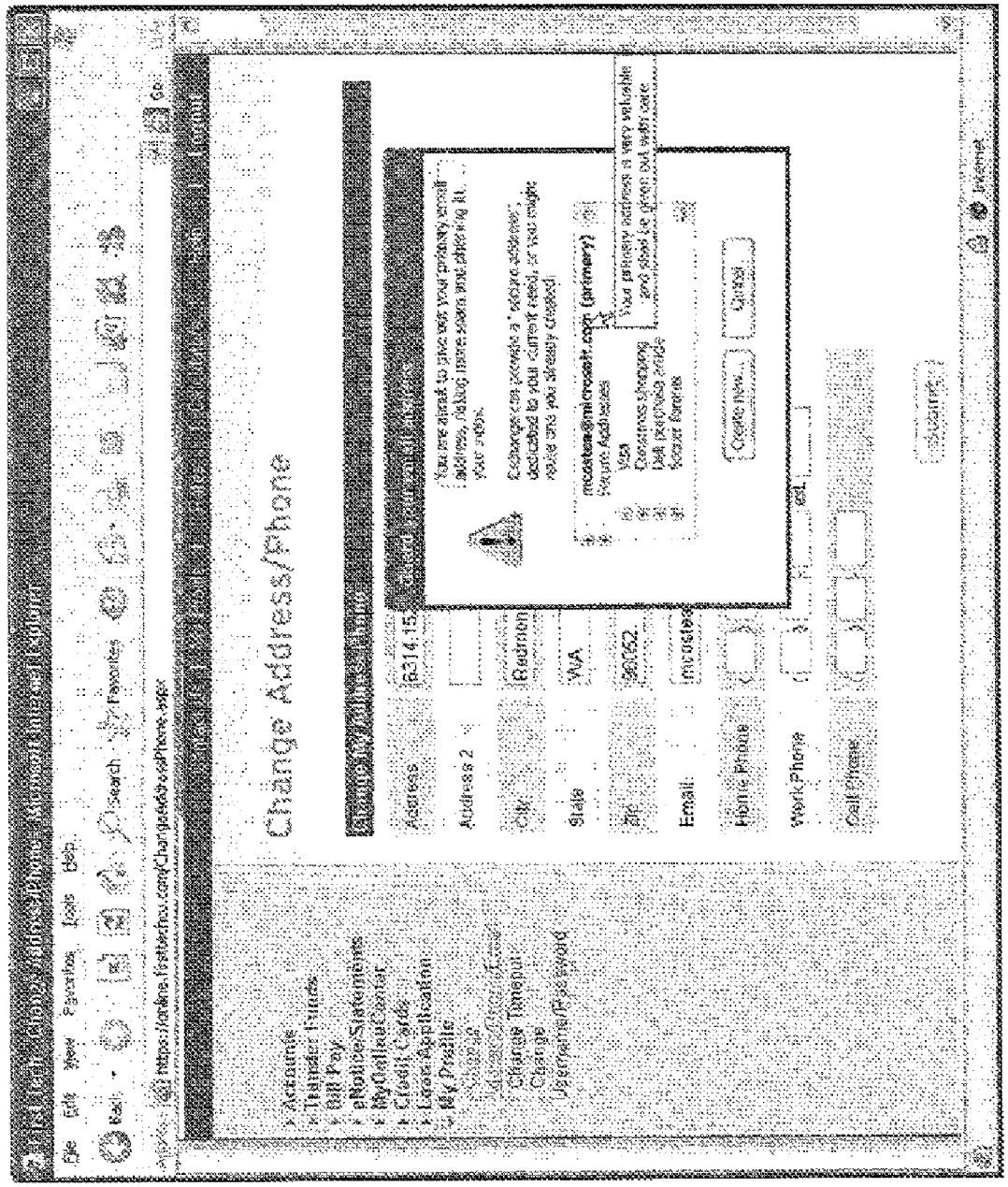

FIG. 2B depicts a "pop-up" window cautioning the end-user that he/she is about to give away his/her primary email address. The browser software running on the end-user device may detect that the web page includes a request for an email address. A browser plug-in may be used to discover that a web service such as described herein is available to a currently authenticated user. Alternatively, such functionality may be built into the browser, and may be made available to the user via the browser toolbar. The detection could occur at the time the web page is rendered, at the time the user clicks into the "Email" field, or at the time the user selects the "submit" button. So-called "autofill" capability may be used to detect when the user starts to enter an email address in the Email field. Or a dedicated button/UI element may be embedded in the page or in the browser toolbar. In any event, when the browser detects that the user has been requested to provide an email address, the browser may react by providing such a pop-up.

The pop-up may caution the user of the risks associated with giving away his primary email address, and offer the user an opportunity to provide a "secure" address that is "dedicated" to the user's current need, e.g., for use with the bank. Because end users usually have more email addresses with different providers (e.g., work/personal/etc), the first choice offered may be choosing the email provider (e.g., Exchange versus Live Mail, as shown). The pop-up may also provide a list of previously-supplied sign-up addresses. The browser may populate a list with such existing relationships. Note that a friendly name may be assigned to each of the sign-up addresses. For example, the user may have previously set-up a sign-up email address for use with his/her Visa card. Rather than displaying the actual sign-up email address, the pop-up window may display "Visa" or any other "friendly" name the user may have associated with that sign-up address. The associations between the friendly names and the sign-up addresses may be stored in the data store on the end-user device, or on the email server eventually and rendered by the end-user device, such that if a user uses multiple machines, this data is available everywhere and not just at one end-user device.

Figure 2C:
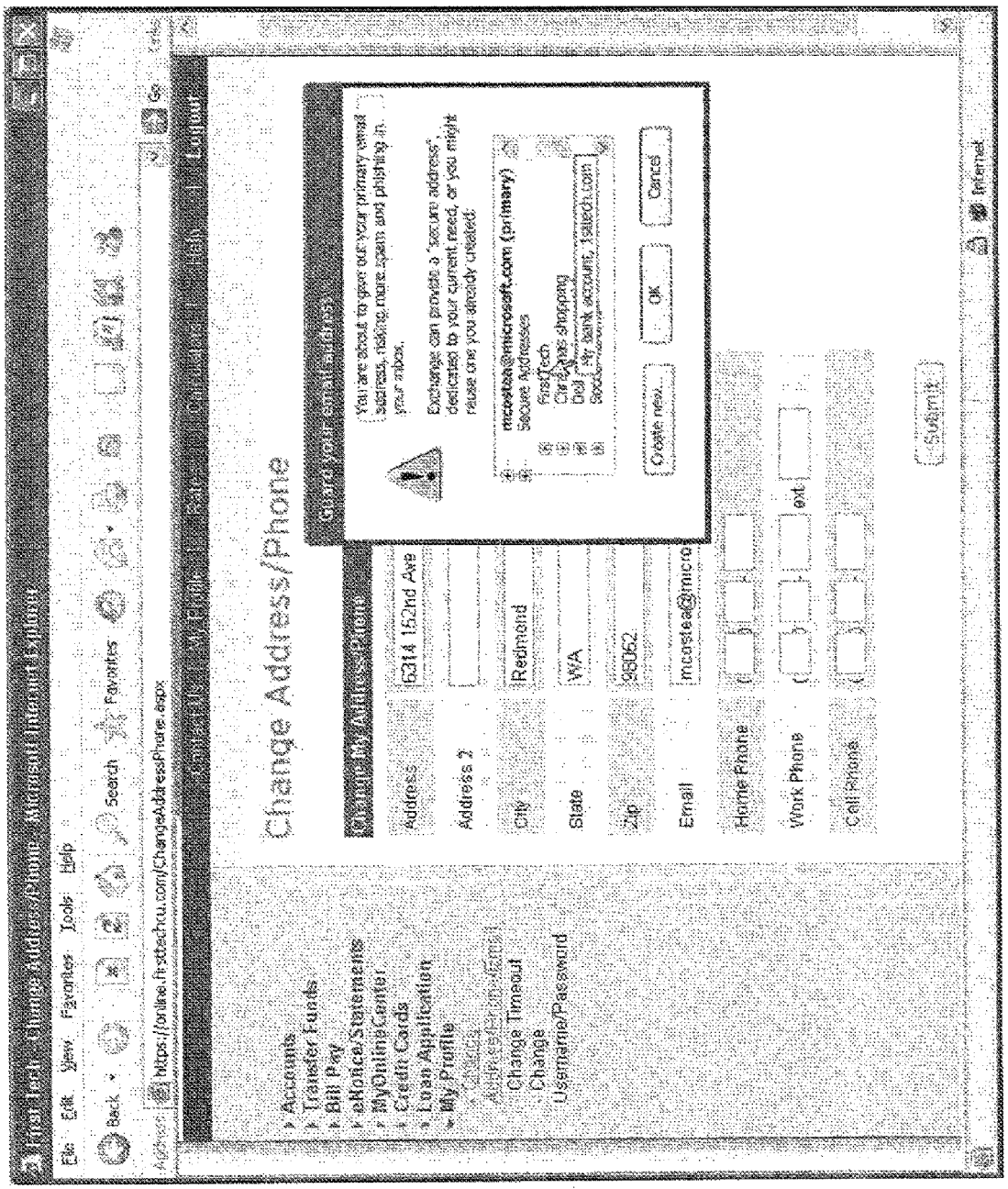

As shown in FIG. 2C, the user can select from among the previously-created sign-up addresses. Alternatively, the user could create a new sign-up address by selecting the "Create new . . . " button, or ignore the pop-up by selecting the "Cancel" button. As shown, the user is inclined to select a sign-up address associated with the user's bank. The sign-up address has the friendly name, e.g., "First Tech."

Figure 2D:
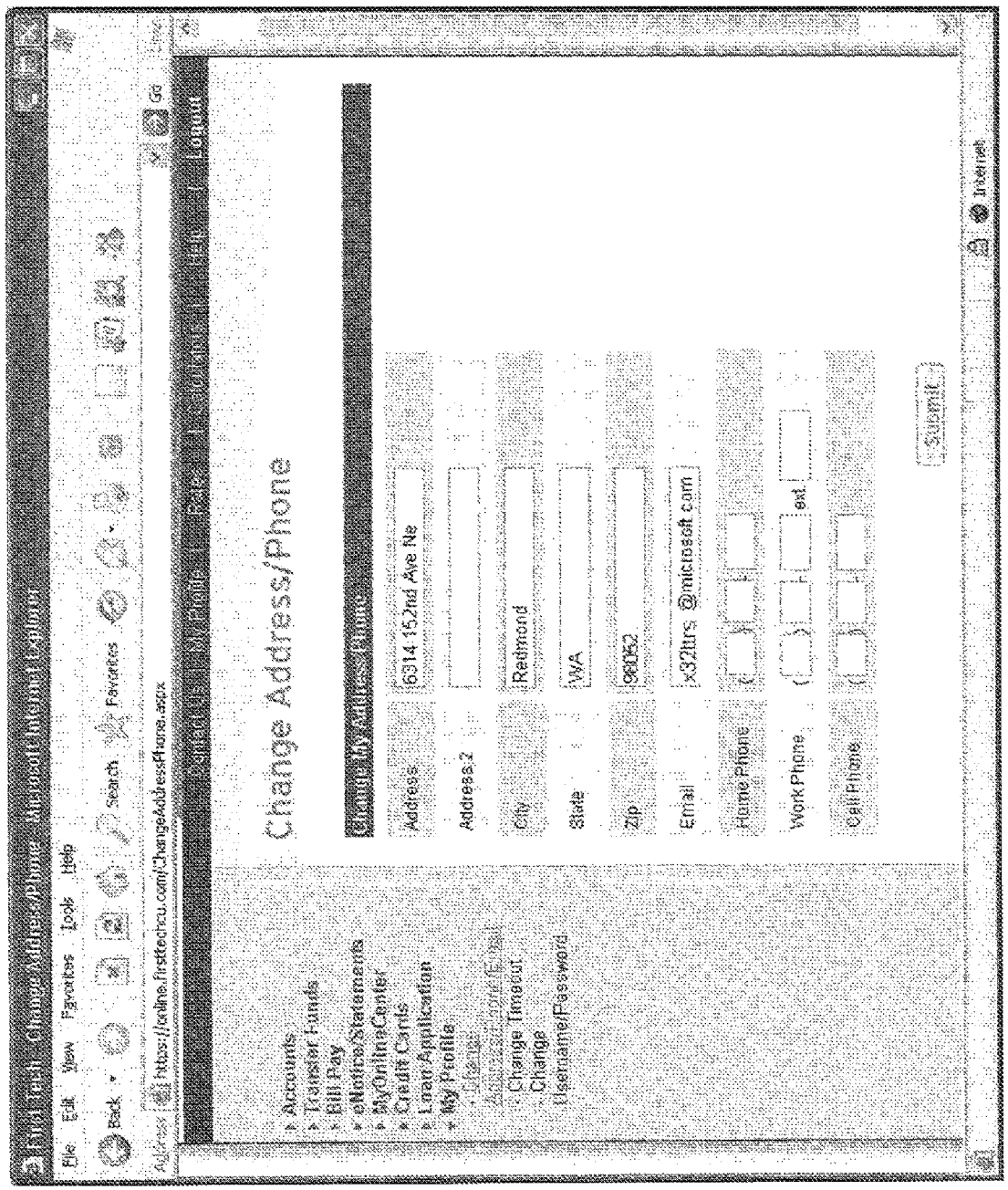

As shown in FIG. 2D, the browser automatically inserts the selected sign-up address into the Email field. Note that the actual address, and not the friendly name, is inserted into the field. The sign-up address might be something proposed completely or in-part by the end user. For example, the end user might associate a user-provided sign-up address, such as Wildflower_2007, with a specific Internet enterprise. The user may then select the "Submit" button to provide the requested information, including the sign-up email address, to the Internet-based enterprise.

Thereafter, emails received from the Internet-based enterprise may be provided to the email client in some fashion that distinguishes them from emails directed to the primary email address, and as being from a trusted provider. For example, emails directed from the enterprise to the sign-up address may be annotated in a way that makes them stand out as being legitimate. Alternatively, the email from the trusted provider may be presented in a dedicated folder associated with the sign-up address. The email service may partition the user's to create such a dedicated folder. Such partitioning may occur, for example, when the sign-up address is first created, or when a first email directed to that address is received.

Figure 3:
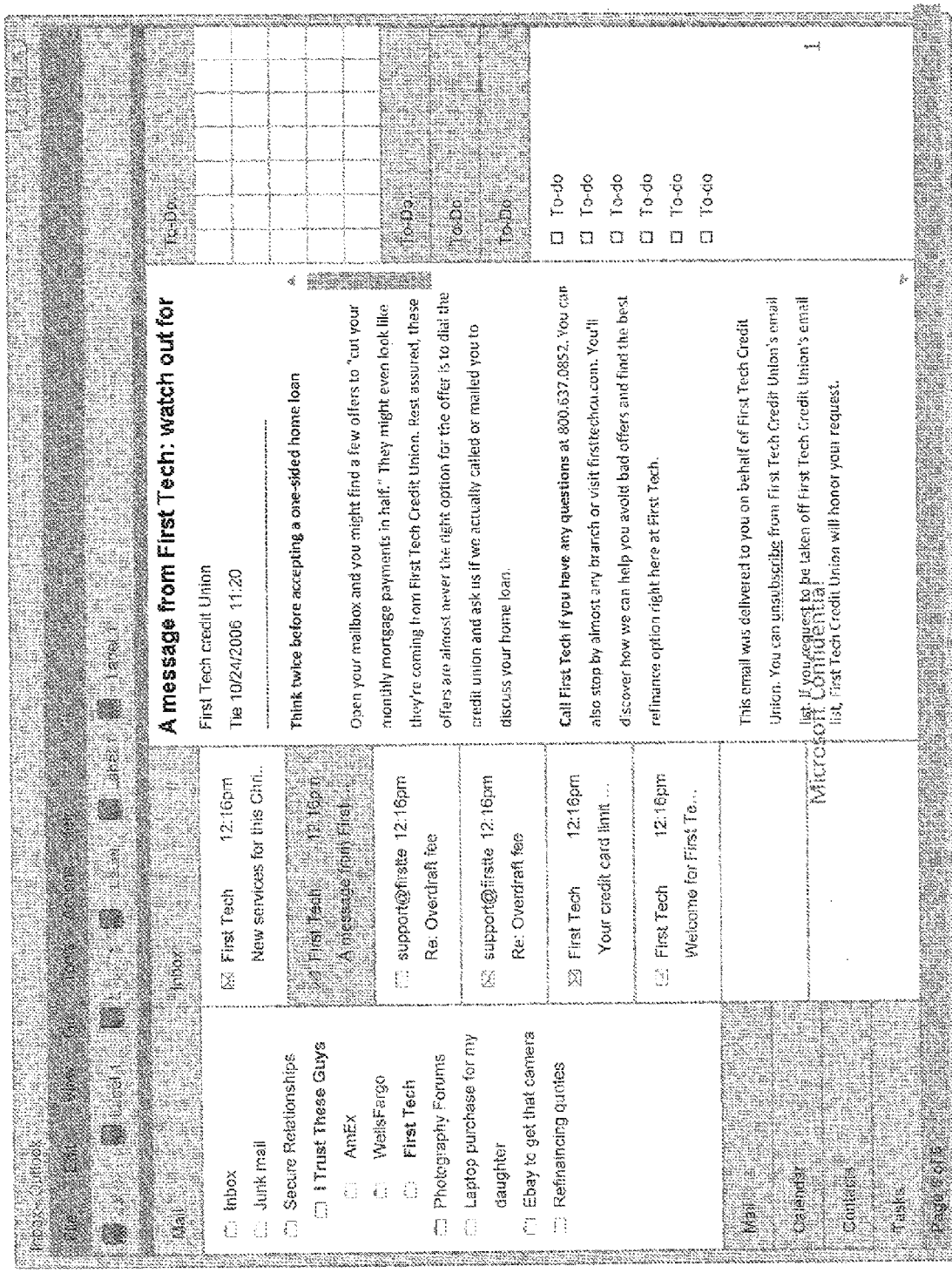
FIG. 3 depicts an email client user interface and method for providing emails directed to sign-up emails addresses in dedicated folders.

FIG. 3 depicts an email client user interface and method for providing emails directed to sign-up emails addresses in dedicated folders. When communications arrive from the enterprise, the email service, following a "rule" associated with the mailbox, may move the email to a dedicated folder. Note the folders list showing the mailbox being partitioned into, among other things, an Inbox, a Junk Mail folder, and a Secure Relationships folder. The Secure Relationships folder is further partitioned into sub-folders for specific trusted relationships. Each of the trusted relationship folders is displayed by its friendly name, e.g., AmEx, WellsFargo, First Tech. An authentication technique, such as SIDF (Sender ID Framework), for example, may be used to allow only emails from the domain associated with the enterprise to be routed to the dedicated folder.

If the user wishes to "unsubscribe," (i.e., to cease getting electronic communications from the trusted enterprise), the user needs only to delete the dedicated folder associated with the enterprise. Dedicated UI for managing sign-up email addresses may be provided. The mailbox rule associated with that folder will also be deleted, and all existing content from the relationship may be preserved or deleted. The recipient filter may begin rejecting emails directed to the sign-up address automatically and provide an appropriate SMTP response, such as "this recipient unsubscribed from this communication."

The systems and methods described herein are likely to provide end users with increased confidence and enhanced user experiences with email media (e.g., images). Phishing is likely to be ineffective, because anything that appears to be from a trusted enterprise, but is not properly annotated or found in the appropriate folder, is unlikely to be from the trusted sender. Accordingly, the user can feel safe in deleting and not acting on such incoming communications. Filters can also be designed to detect and filter out such communications. Thus, though phish might still arrive in a junk folder or even in the inbox, the end user can recognize it and not act on it.

Additionally, users will likely be hit with less spam. Spam address lists will become harder to sell because sellers of such lists will become more identifiable, risking reputation taint. Spam address lists will be harder to maintain accurately because entries expire. Spam will be easier to recognize. For example, a random subject email sent to a sign-up address can be deleted without opening. Also, detecting such sign-up addresses is expect to be very difficult, because the sign-up address is shared only with the trusted enterprise and is constructed in such a way (e.g., long unique addresses) that directory attacks against such addresses take a very long time to discover. Email servers can detect the spammers who are trying to do a directory harvest attack and close connections, thus making their attempts unsuccessful.

Meanwhile, the systems and methods described herein also provide benefits to legitimate senders, such as increased deliverability and visibility of legitimate email. Financial statements, for example, need not be buried with other mail items or lost in junk mail. There is no incentive to share the sign-up address with others, and thus risk unsubscription.

Such systems may also be better for marketers in the sense of improved ad targeting. People may be more likely to give a more accurate and precise profile if they can be sure that the profile cannot be linked back to their primary email address and identification. A better view and cross-correlation on backend for marketers may be provided where such a system is in place.

Exemplary Computing Arrangement

Figure 4:
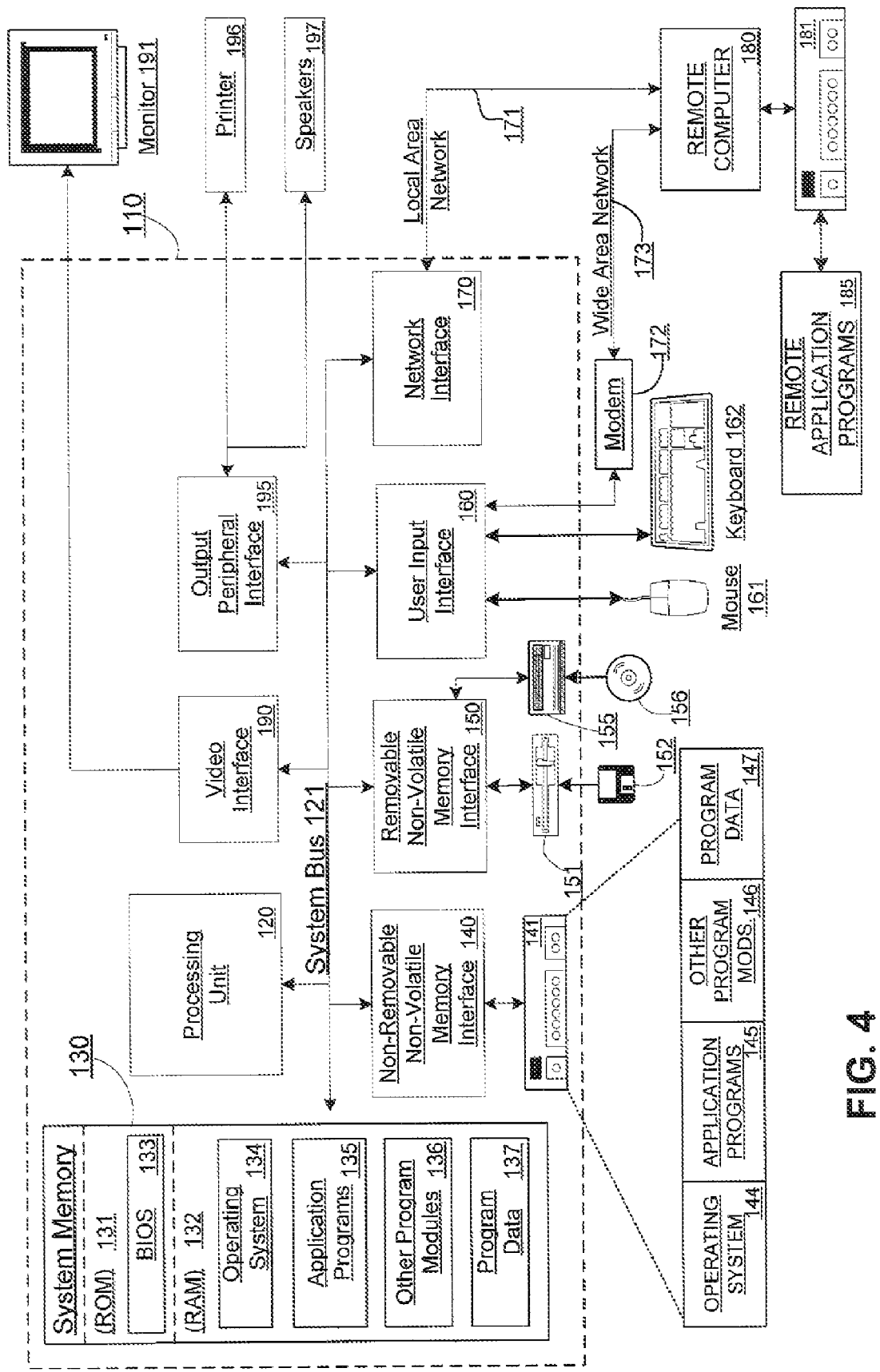
FIG. 4 is a block diagram of an example computing environment in which example embodiments and aspects may be implemented.

FIG. 4 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   when a user is presented with a user interface of an enterprise requesting an email address of the user, automatically displaying a pop-up window notifying the user that an email address is requested;
   providing the user with an option in the pop-up window, to select a name, wherein the name is associated with a first email address;
   automatically inserting the first email address as a sign-up email address into an email field of said user interface, the sign-up email address being different from a primary email address associated with the user;
   providing to an email service an association between the sign-up email address and the primary email address;
   providing to the email service an association between the sign-up email address and the enterprise; and
   presenting an email directed from the enterprise to the sign-up email address in a manner that distinguishes the email from other emails directed to the primary email address, wherein:
   the option to enter a sign-up email address an option to create a new sign-up address and associate a friendly name therewith;
   the primary email address is one entry in a list displayed in the pop-up window; and
   the pop-up window is configured to provide a warning associated with the primary email address when a cursor is placed over the primary email address.

2. The method of claim 1, further comprising automatically detecting that the user has been requested to provide an email address into a web page provided by the enterprise.

3. The method of claim 1, wherein providing the user with the option to enter a sign-up email address into the user interface comprises providing the user with an option to have the sign-up address automatically generated on behalf of the user and an option for the user to customize the sign-up address.

4. The method of claim 1, wherein providing the user interface comprises providing a folder list that includes a dedicated folder that is associated with the sign-up email address.

5. The method of claim 4, wherein the email directed from the enterprise to the sign-up email address is presented in the dedicated folder.

6. The method of claim 1, wherein the email directed from the enterprise to the sign-up email address is annotated and presented in a mailbox associated with the primary email address.

7. The method of claim 1, further comprising storing a list of previously-created sign-up addresses, along with a respective friendly name associated with each.

8. The method of claim 7, wherein providing the user with the option to enter a sign-up email address into the user interface comprises providing the user with an option to select one of the previously-created sign-up addresses from the list.

9. A method comprising:
   automatically detecting when a user has been requested to provide an email address into a web page provided by an enterprise;
   in response to said detecting, automatically displaying a pop-up window notifying the user that an email address is requested and providing the user with an option in the pop-up window, to select a name, wherein the name is associated with a first email address;
   automatically inserting the first email address, which has been identified by the selection of the name, as a sign-up email address into an email address field of the user interface, the sign-up email address being different from a primary email address associated with the user;
   providing an association between the sign-up email address and the primary email address associated with the user;
   providing an association between the sign-up email address and the Internet-based enterprise; and
   presenting an email directed to the sign-up address, in a form that distinguishes the email from other emails directed to the primary email address, wherein:
   the option to enter a sign-up email address an option to create a new sign-up address and associate a friendly name therewith;
   the primary email address is one entry in a list displayed in the pop-up window; and
   the pop-up window is configured to provide a warning associated with the primary email address when a cursor is placed over the primary email address.

10. The method of claim 9, wherein providing the email to the email client comprises providing the email to a dedicated folder associated with the sign-up address.

11. The method of claim 10, further comprising partitioning a mailbox associated with the user to create the dedicated folder.

12. The method of claim 9, further comprising authenticating the identity of the sender of the email, and not annotating the email if the sender is not authenticated.

13. A system comprising:
- a computing device executing computer-program instructions for providing an email client and a browser;
- wherein the browser automatically detects when a user has been requested to provide an email address into a web page provided by an enterprise; automatically displays a pop-up window that notifies the user that an email address is requested; provides the user with an option in the pop-up window, to select a name, wherein the name is associated with a first email address; automatically inserts the first email address as a sign-up email address into the user interface, the sign-up email address being different from a primary email address associated with the user; provides to an email service an association between the sign-up email address and the primary email address; and further provides to the email service an association between the sign-up email address and the enterprise; and
- wherein the email service receives the association between the sign-up email address and the primary email address, receives the association between the sign-up email address and the enterprise, receives an email directed to the sign-up address from the enterprise, and provides the email to the email client in a form that distinguishes the email from other emails directed to the primary email address, wherein:
  - the option to enter a sign-up email address an option to create a new sign-up address and associate a friendly name therewith;
  - the primary email address is one entry in a list displayed in the pop-up window; and
  - the pop-up window is configured to provide a warning associated with the primary email address when a cursor is placed over the primary email address.

14. The system of claim 13, wherein the email client provides a user interface wherein the email directed from the enterprise to the sign-up email address is presented in a manner that distinguishes it from emails directed to the primary email address.

15. The system of claim 14, wherein the email service annotates the email directed to the sign-up address from the enterprise in a manner that distinguishes it from emails directed to the primary address, and the email client presents the email in an inbox associated with the primary address.

16. The system of claim 14, wherein the email service provides the email to a dedicated folder in a mailbox associated with the user, and the email client presents the email in the dedicated folder.

17. The system of claim 16, wherein the email service partitions the mailbox associated with the user to create the dedicated folder.

18. The system of claim 13, wherein the name is one entry in a list displayed in the pop-up window, and wherein the pop-up window is configured to provide a description associated with the name when a cursor is placed over the name.

* * * * *